April 5, 1966 — J. K. BARRY — 3,244,212
RETRACTABLE THREADED FASTENER
Filed Nov. 18, 1964 — 2 Sheets-Sheet 1
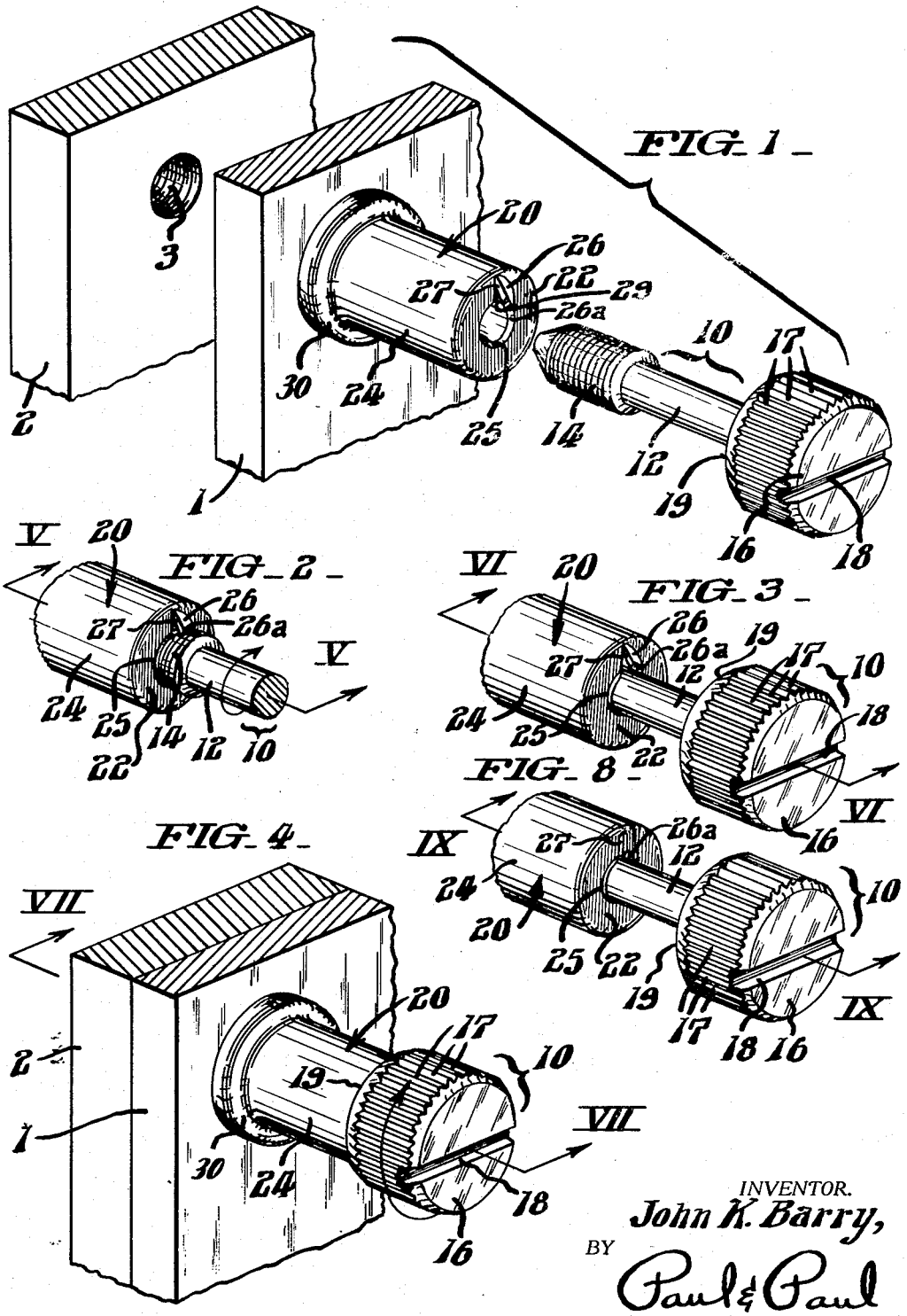
INVENTOR.
John K. Barry,
BY Paul & Paul
ATTORNEYS.

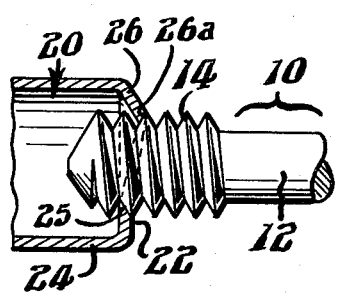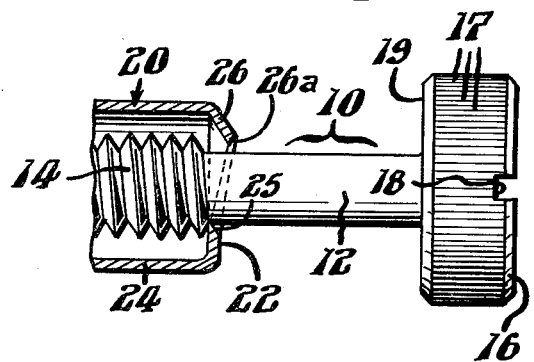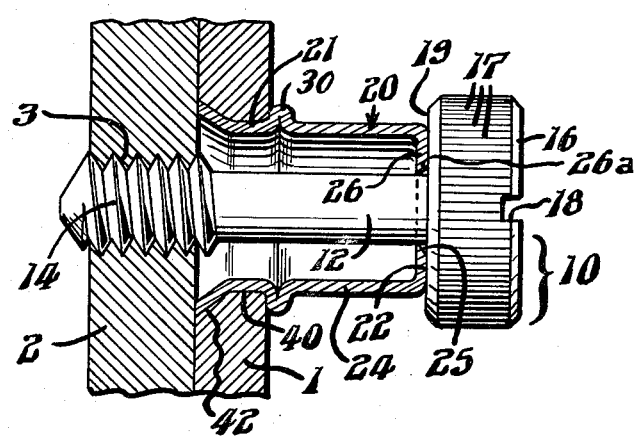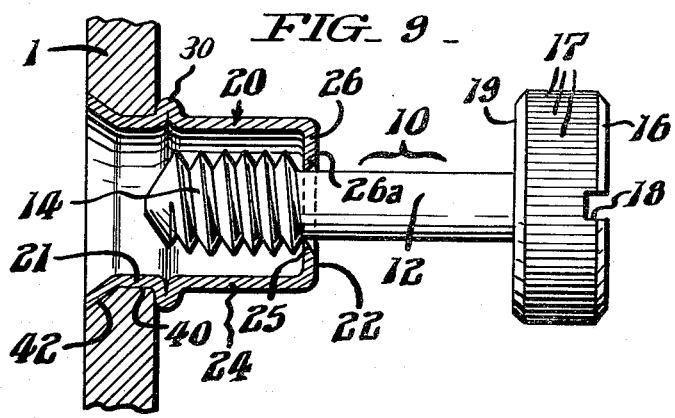

United States Patent Office 3,244,212
Patented Apr. 5, 1966

3,244,212
RETRACTABLE THREADED FASTENER
John K. Barry, Springfield, Pa., assignor to South Chester Corporation, Lester, Pa., a corporation of Delaware
Filed Nov. 18, 1964, Ser. No. 412,145
2 Claims. (Cl. 151—69)

This invention relates to a retractable threaded fastener assembly and, in particular, to a threaded standoff fastener assembly having means for captivating the screw within the standoff when the screw is not engaged in a second panel.

It is the primary object of this invention to provide a standoff fastener assembly wherein a screw is made captive within the standoff after initial insertion without the use of tools and said screw thereafter cannot readily be separated from the standoff and thereby remains in position for subsequent employment.

It is another object of this invention to provide a screw standoff in a fastener assembly having the above described advantages wherein the standoff is light in weight, of high strength and corrosion resistant, and is one which can be readily attached to a supporting panel without requiring additional parts or special tools.

It is a further object of this invention to provide a screw standoff having the above advantages which can be economically fabricated from relatively thin sheet metal by the use of rapid and automatic production techniques such as by utilizing a punch press or four-slide machines.

It is a further object of this invention to provide a screw standoff having the above advantages which can be fabricated from stainless steel sheet and thereby incorporate in the screw standoff the desirable qualities of that metal, such a great strength and corrosion resistance. These objects and other attendant advantages of this invention will become more apparent from the description set forth hereinbelow and from the drawings attached hereto, wherein:

FIG. 1 is a perspective view of the preferred form of the retractable threaded fastener assembly of this invention together with the supporting panel and the attached panel;

FIGS. 2, 3 and 4 are partial perspective views of the screw being progressively inserted in the standoff;

FIGS. 5, 6 and 7 are partial sectional views of the fastener assembly taken along the similarly numbered lines and arrows in FIGS. 2, 3 and 4;

FIG. 8 is a partial perspective view of the fastener assembly after the screw is made captive in the standoff; and FIG. 9 is a sectional view taken along the lines and arrows IX—IX of FIG. 8.

The preferred form of the retractable threaded fastener assembly of this invention comprises a screw, generally designated by the numeral 10, and a screw standoff, generally designated by the numeral 20 as shown in FIG. 1. The screw 10 includes a substantially uniform diameter shank 12 of a selected length, a series of threads 14 located at the inner or engaging end of the shank 12 and an enlarged diameter head 15 located at the distal or outer end of the shank 12 considered from the point of view of the direction of assembly of the screw. The unthreaded shank or throat 12 has an outside diameter smaller than the outside or major diameter of the threads 14. The unthreaded diameter of shank 12 can be the same as the thread pitch diameter in the case of rolled thread screws or the same as the thread minor diameter on cut thread screws, as shown. However, the outside diameter of the shank 12 may be slightly greater than the minor diameter of the threads 14, or substantially smaller, as long as it is slightly smaller than the major diameter of the threads 14. The cylindrically shaped screw head 16 is provided with a series of axial serrations 17 located around its surface to enhance manual turning. The head can include a slit 18 to facilitate rotating the screw 10 by a screw driver or the like. The opposing flat surface 19 of the head 16 is sufficiently large to press against the outer facing surface 22 of the standoff when the screw is engaged in the second panel as described hereinbelow.

The preferred form of the standoff 20 has a generally tubular or cylindrical body 24 shown in sectional view in FIG. 7, and an annular or circumferential rib 30 which prevents the standoff from drawn into or through supporting member 1. The outer facing generally annular supporting surface 22 is substantially flat and located in a plane parallel to that of supporting member 1. A bore or hole 25 is provided in surface 22 generally in the center and said bore has a diameter slightly less than the major diameter of the screw threads 14. A generally triangular edge portion 26 is displaced away from the plane of surface 22 and extends outwardly from the standoff in the direction shown. The displaced surface portion 26 is formed by splitting or notching out a portion of the surface 22 contiguous the bore 25 along a cut 27 formed radially from the bore 25. When displaced outwardly as described herein and disclosed in the drawings, the edge 26a defining the bore 25 has a helical cross section which allows the larger diameter screw threads 14 to pass through bore 25 by being threaded therein and, specifically, threaded through gap 39 formed by the displaced surface portion 26.

The standoff 20 is preferably permanently attached to a first panel or supporting member 1 and the threaded screw operates against the standoff by engaging a second panel or member 2 as illustrated in FIGS. 1, 4 and 7. The standoff can be attached to member 1 by a variety of means but the preferred method is to drill or punch a hole in member 1 and flare outwardly the tubular inner end of the standoff as described in further detail below.

In the preferred process for producing the standoff of this invention, the standoff 20 is first formed in the shape of a cup from flat sheet or strip metal by several deep-drawing or forming stages on a punch press die. Subsequently, the cup is crimped to form the circumferential rib 30 and hole or bore 25 is cut or punched out by a suitable tool. Then, the hole or bore 25 is split and notched and a partial helical construction formed by displacing portion 26 outward. Although the helix construction may be created by forming part of the rise or displaced portion above the plane of the hole and part of the rise below the plane of the surface 22, i.e., within the standoff 20, subsequent screw retention obtained will not be as complete as when the helical rise is all above or outward of the surface 22 as shown best in FIGS. 1, 5 and 6.

The fastener is assembled and attached to the supporting member by the following operation.

Referring to FIGS. 7 and 9 of the drawings, supporting member 1 to which the fastener is to be mounted is prepared for installation by drilling or punching a round clearance hole 40 which is of sufficient diameter to accept therein the opened tubular end 21 of the standoff 20. Hole 40 may be counter-sunk at 42. The open tubular end 21 of the standoff is then pushed into hole 40 from the surface, described herein as the outside surface, up to rib 30.

A back-up punch (not shown) provided with a center clearance hole to receive the standoff is slipped over the outward facing standoff and held against the circumferential rib 30. A tapered-end flaring tool is positioned within and against standoff end 21 then struck with a suitable tool causing standoff end 21 to flare out tightly into the counter-sunk hole 42 thereby preventing the standoff from being withdrawn outwardly. Of course, standoff end 21 can be flared along and parallel to the inner surface of supporting member 1 without the use of counter-sunk hole 42.

After the standoff 20 is attached to panel 1 in the manner described above or its equivalent, a suitable threaded bore 3, or its equivalent such as a nut, is formed in panel 2 to receive the screw threads 14.

The screw, heretofore separate from the standoff, is then initially threaded into the standoff and made captive as described below. Because of the helical configuration of hole edge 26a and displaced portion 26, screw threads 14 can be threaded through hole 25 into the standoff as shown in FIGS. 2 and 5. Screw 10 is rotated until threads 14 pass completely within the standoff 20 as shown in FIGS. 3 and 6 and then the insert is advanced with edge 26a sliding along shank 12.

At this point, panel 2 is placed against frame member 1 as shown in FIGS. 4 and 7 so that the tapped hole 3 is in substantial alignment with hole 40 and the axis of standoff 20. The screw threads 14 are then threaded into hole 3 and tightened so that the flat inner surface 19 of the screw head 16 is drawn against outwardly facing surface 22, and specifically, displaced portion 26, as shown in FIGS. 4 and 7. As the threaded screw continues to be tightened, the screw head presses harder against the displaced portion eventually pressing it back into the plane of surface 22 of the standoff thereby destroying the helical configuration of edge 26a. The final result being, as shown in FIGS. 8 and 9, that upon subsequent disengagement of the screw threads from panel 2, the screw threads 14 can no longer be withdrawn out of hole 25 and screw 10 is made captive within the standoff. Thus, the screw is held within the standoff along the length of its shank and between the limits of threads 14 and head 16. Screw 10 cannot be unscrewed from the standoff or pulled or pressed back out of hole 25 except with great effort.

This construction allows the screw to be withdrawn and held within the standoff automatically when separation of the members 1 and 2 is desired. As the screw can be completely withdrawn in the standoff when the unthreaded shank 12 is sufficiently long, as shown in FIG. 9, member 1 can be placed lying downward on its inner face without the studs protruding through and causing damage or occupying additional storage area. It may be found desirable to make the length of the shank 12 comparatively short so that screw 10 cannot be fully retracted into the standoff. In this form, the screw would act to jack out the panel 2 when the screw threads engaged against the inner face of the standoff surface 22.

The form of standoff described herein is suitable for manufacture in any desired diameter or length within the capabilities of punch press operation. Various types of materials can be used and different thickness of sheet or strip can be selected depending upon the desired standoff strength.

In some cases, the metal thickness of the displaced portion 26 of the standoff will be greater than the crest to crest distance between adjacent screw threads and it will be necessary to swage the metal into a tapered down V type form so as to more readily permit it to pass between the screw threads to the desired depth.

Although the preferred form of the invention is disclosed and described herein with particularity, it should be obvious that certain modifications and changes can be made without departing from the scope of the invention or the claims. For instance, a mating nut can be substituted for threaded bore 3 to engage the screw threads. Similarly, standoff 20 can be attached to the first member 1 by other means suitable to the particular use. In addition, the length of shank 12 can be varied and the helical displaced portion 26a can be otherwise shaped to initially allow the insertion of the threads and then prevent their removal. Such modifications and equivalents are considered to be within the scope of the claims.

Having thus described my invention, I claim:

1. The combination comprising a first panel member and a second panel member, a threaded opening formed in said first panel member, an opening formed in said second panel member, standoff member fixedly attached to the second panel member and in operative communication with the second panel member opening, said standoff extending outwardly from the second panel member substantially at right angles to the outer surface thereof and terminating in a generally flat surface having a circular opening in operative communication with the second panel opening through the interior of said standoff, a displaced portion forming a helical edge and extending outwardly from the flat surface of the standoff, a screw member consisting of a threaded shank at one end, an intermediate shank portion of reduced diameter and a head element fixedly attached to the end of the intermediate shank opposite the threaded end, said head having a diameter larger than the major diameter of the threaded shank, said threaded shank being adapted to engage the helical edge of the standoff formed by the displaced portion thereof, whereby further turning of said threaded shank will cause it to pass through the interior of said standoff to engagement with the threaded opening in said first panel member with ultimate engagement of the head element forcibly against the displaced portion thereby flattening said displaced portion thus holding said screw member captive within said standoff.

2. The combination of claim 1 further characterized by means for fixedly mounting said standoff with its inner end within the opening in said second panel member, said means comprising a flared tubular portion and a circumferential rib contacting the outer surface of said second panel member.

References Cited by the Examiner

UNITED STATES PATENTS

| 2,010,853 | 8/1935 | Dyer | 151—69 |
| 2,470,927 | 5/1949 | Hale | 151—69 |
| 3,138,188 | 6/1964 | Tuozzo et al. | 151—69 |

FOREIGN PATENTS 395,321  10/1931  Great Britain.

EDWARD C. ALLEN, *Primary Examiner.*